United States Patent [19]

Shaffer et al.

[11] Patent Number: 5,008,865
[45] Date of Patent: Apr. 16, 1991

[54] LIGHT SOURCE WITH GRADUALLY CHANGING INTENSITY

[75] Inventors: Blaine P. Shaffer, 12305 9th Ave., SW., Seattle, Wash. 98146; William G. Haab, Bothell, Wash.

[73] Assignee: Blaine P. Shaffer, Seattle, Wash.

[21] Appl. No.: 525,877

[22] Filed: May 17, 1990

Related U.S. Application Data

[63] Continuation-in-part of Ser. No. 221,716, Jul. 20, 1988, abandoned.

[51] Int. Cl.$^5$ .................... G06B 47/00; G04C 21/16
[52] U.S. Cl. .................................... 368/10; 368/256; 315/194
[58] Field of Search ............... 368/10, 12, 72–74, 368/79, 250, 256; 315/360

[56] References Cited

U.S. PATENT DOCUMENTS

| | | | |
|---|---|---|---|
| 3,545,195 | 12/1970 | Krischker | 368/256 |
| 3,727,395 | 4/1973 | Baylor | 368/256 |
| 3,798,889 | 3/1974 | Chapwick | 368/256 |
| 4,016,451 | 4/1977 | Engel | 315/158 |
| 4,379,237 | 4/1983 | Mosteller, Jr. | 507/141 |
| 4,395,660 | 7/1983 | Waszkiewicz | 315/291 |
| 4,482,844 | 11/1984 | Schweer | 315/194 |
| 4,484,190 | 11/1984 | Bedard | 340/825.57 |

FOREIGN PATENT DOCUMENTS

| | | | |
|---|---|---|---|
| 1965062 | 12/1969 | Fed. Rep. of Germany | 368/256 |
| 2045981 | 11/1980 | United Kingdom | 368/256 |

*Primary Examiner*—Vit W. Miska
*Attorney, Agent, or Firm*—Seed and Berry

[57] ABSTRACT

A device and method of awaking a sleeper includes an alarm clock coupled to a control circuit for controlling the power provided to a lamp. After the alarm clock wake-up signal is provided, the light intensity emitted by the lamp slowly, smoothly and gradually increased. The time interval over which the light intensity increases is selectable by the user but will usually be in the range of thirty minutes to an hour. The circuit for increasing the light intensity is designed to ensure that the intensity increase is smooth, especially at the beginning of the wake-up cycle. The circuit may be either analog or digital. In each embodiment, an optocoupler is controlled to lower the firing angle of a triac to gradually increase the intensity of the light. The circuit causes the firing angle to change more slowly when the light is very dim then when the light intensity is bright because the human eye is more sensitive to light intensity variations when the background light level is low than when it is high.

1 Claim, 7 Drawing Sheets

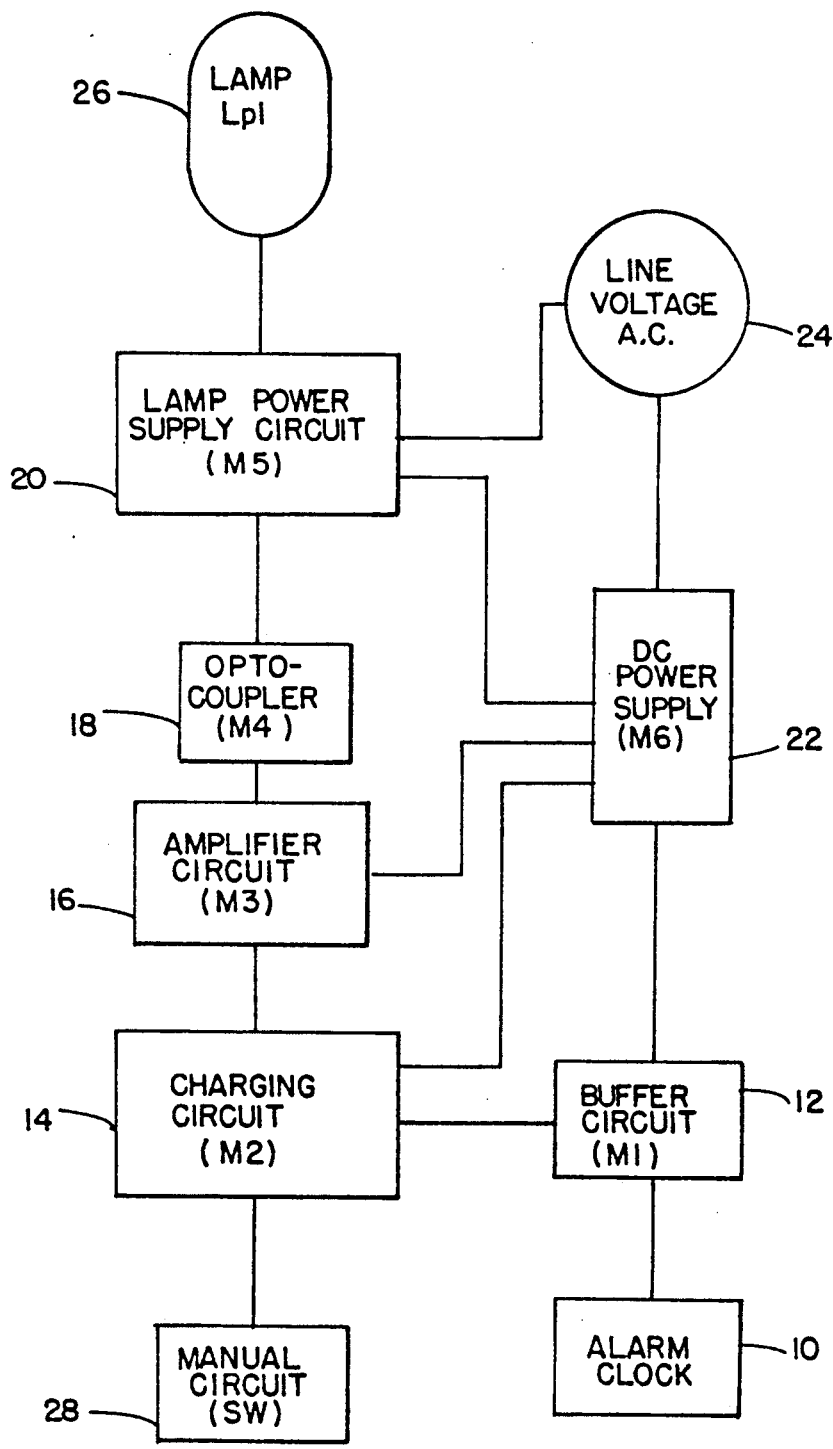

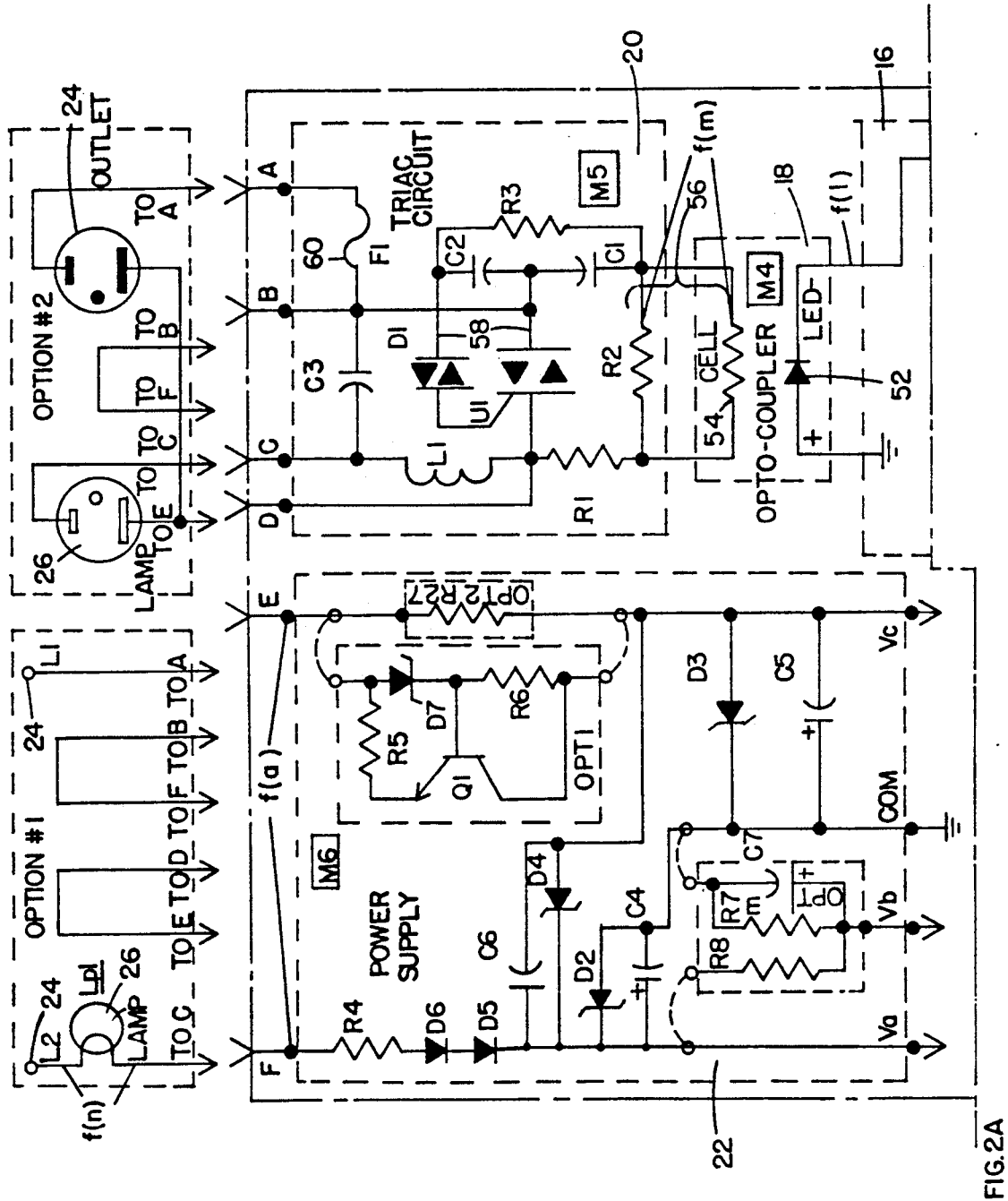

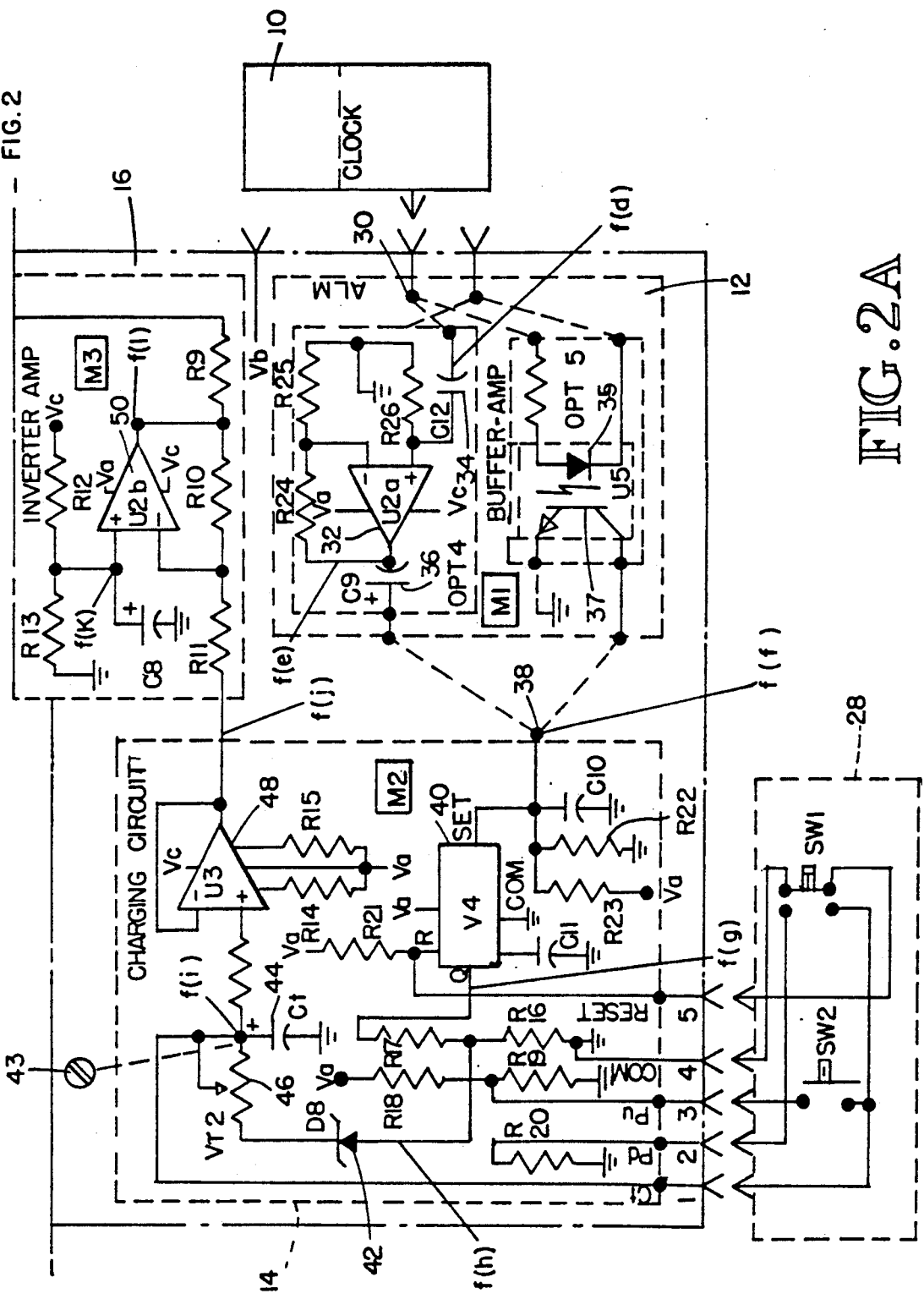

LIGHT SOURCE WITH GRADUALLY CHANGING INTENSITY

CROSS-REFERENCE TO RELATED APPLICATION

This application is a continuation-in-part of U.S. application Ser. No. 07/221,716 filed July 20, 1988, now abandoned.

DESCRIPTION

1. Technical Field

This invention relates to circuits for controlling the voltage applied to a light source, and more particularly, to a circuit for gradually varying the power applied to a light source to aid in awakening a sleeper.

2. Background Art

Numerous devices and methods for awakening a person from sleep are presently in use. Among these devices are included clock radios, alarm clocks, and other devices which emit a loud sound at a preselected time to awaken the sleeper. Another method, frequently used by a third person who desires to awaken a sleeper, is to immediately turn on the main lights in the room. The rapid change from dark to light shining above the sleeping person's face awakens the sleeper, even though his eyes are closed.

The methods of awakening a sleeper mentioned above do so with a sudden jolt to the sleeper. The sudden loud ring of a bell, buzz of an electric clock, or flash of light shock the brain and body of the sleeper from whatever state of sleep he is in into sudden wakefulness. The sudden shock to the sleeping body, while designed to awaken the sleeper, has detrimental side effects. Many people, immediately upon being so awakened, are very irritable and angry. There have been reported instances of an otherwise mild-mannered and gentle person, upon being suddenly awakened, reacting violently, such as by breaking the alarm clock, throwing an object, refusing to talk for the next twenty minutes, or the like. If a bright light is used in place of an audio alarm to awaken the sleeper, the sudden change from dark to light not only shocks the sleeper's body but also causes the additional effect of temporary blindness and significant discomfort for the sleeper until his eyes have adjusted.

Recent electronic alarm clocks provide a snooze button that the sleeper may press after the first sudden jolt to give him ten to twenty minutes to fall back asleep or rest before receiving a second jolt or being forced to rise. Some alarms permit the user to select a radio station which plays pleasing music, the music being turned on at the time of the alarm to awaken the sleeper. The proposed solutions are somewhat less painful than a loud buzz or bright light but still do not solve the problem of shocking the brain and body by suddenly changing the sleeping environment to awaken the sleeper at a preselected time.

The detrimental effects of suddenly awakening a sleeper from any given state of sleep are not fully understood. Some effects, such as irritability, are immediately apparent, but the effect on the performance of the body and brain throughout the day is not clear. In some stages of sleep, the sleeper's respiratory rate, heart rate, and other body functions are very slow. In other stages of sleep, such as REM sleep (where dreaming occurs) or in light sleep, the body functions are at different rates than in deep sleep. A sudden jolt from one of the different stages of sleep produces different effects on the body. A person awakened from a deep sleep state may be much more irritable than one awakened from a light sleep state. Work performance throughout the morning and after noon hours may remain significantly affected by the sudden jolt from one type or another of sleep.

Recent studies have indicated that the human body contains its own internal biological clock. The biological clocks adjust to changes in the environment. When days are long in the summer and short in the winter, the biological clocks automatically readjust. The body's clock runs on what is known as a "circadian rhythm," in synchronism with apparent movement of the sun.

Our bodies, like most living things, adjust to changes in light. At the base of the brain, a cluster of nerve cells, the suprachiasmatic nuclei (SCN), monitor light reaching the body. The SCN not only distinguish intensity changes, as from night to day, but also distinguish and respond to changes in the length of day and changes in light intensity at different times of the day, even though the changes in light intensity may be so small as not to be perceptible to the conscious mind. This bundle of nerve cells, the SCN, sends out signals to the major control centers in the body that control, among other things, sleeping, body chemistry throughout the day, growth and sexuality. While not prior art to the present invention, an article in the December 1987 *National Geographic* titled "What is this thing called sleep?" by Michael E. Long, recognizes the body's sleep states and the ability to alter the body's clock using light. According to the article, one Harvard researcher, Dr. Charles Czeisler, has demonstrated that by using bright light, a person's circadian rhythms and internal biological clock can be shifted dramatically. The article, on page 803, states that Dr. Czeisler has positioned persons in front of lights mimicking sunrise or sunset to reset the biological circadian clock of a person.

Nature provides a gradual and smooth increase of ambient light at the beginning of each day with the rising of the sun. The ambient light outside begins to very gradually increase from the darkness of night to the light of sunrise over a one to one-half hour period just prior to sunrise. The amount of time between when the sky begins to lighten and when the sun actually rises depends upon the distance from the equator: the greater the distance from the equator, the longer the time between when the sky begins to lighten and the actual sunrise time. Similarly, after the sun has set, the sky remains light for a period of time and gradually darkens to the night condition.

The biological clock of a person operates, when possible, in synchronism with the sunrise and sunset at his position on the earth. When the biological clock is not in synchronism with their working day and the local sunrise and sunset, mental ability and body performance are significantly lowered. Recent studies of people suffering jet lag and of people working swing shift have demonstrated that mental and physical performance is impaired because their internal biological clock is not synchronized with their work day.

Unfortunately, many people in today's world are not able to take advantage of the natural light change at the start and end of each day. Many people must awaken and fall asleep on a schedule different from the rising and the setting of the sun. For example, many people must be awakened before the sun rises in order to prepare for work and arrive at work on time. Other people, such as those working a swing shift or living in a northern latitude in the summer, desire to sleep well past the sunrise time and be awakened later to prepare for and start their work day. Similarly, many people desire to remain awake after the sun has set and go to sleep on their own schedule, for example, after watching a particular television program or the like. The schedule at which each person awakens and goes to sleep each day may be significantly different from the sunrise and sunset times of each day.

DISCLOSURE OF THE INVENTION

It is an object of this invention to provide an apparatus that causes a gradual and smooth change in the perceived light intensity to awaken a sleeper or to aid a person in falling asleep.

It is another object of this invention to provide a method of awakening a person which does so by slowly increasing, at a rate selected by the user, the ambient light.

It is a further object of this invention to provide a method of awakening a person in a gentle and smooth manner, permitting the person's body function and chemistry to have sufficient time to prepare to be awake.

It is a further object of this invention to provide a device to assist persons, particularly young children, in going to bed at night by gradually dimming the light in a room to assist them in falling asleep.

These and other objects of the invention, as will be apparent herein, are accomplished by providing a circuit which gradually varies the luminosity of a lamp. An electrical pulse, such as from an alarm clock, begins the operation of the circuit at a preselected time. The intensity control circuit gradually and smoothly increases the RMS voltage applied to the lamp from a low voltage level towards the line voltage level.

The intensity control circuit includes a capacitor in an RC circuit which is charging towards a final voltage. The voltage supply applied to the RC circuit is a constant value with isolation to minimize the noise to ensure that the voltage level of the charging capacitor increases smoothly. The output voltage of the charging capacitor is coupled to an operational amplifier. The output of the operational amplifier, having the charging capacitor as its input, is coupled to an operational amplifier having a negative gain. The output of the negative gain operational amplifier is coupled to an "optocoupler" having an LED adjacent a photoresistor. The negative gain amplifier is biased in the "on" state, drawing current through the LED at all times. By having the LED in the "on" position, the change in intensity in the lamp is very gradual, from a very low-intensity level to the high intensity level.

The photoresistor is part of a parallel resistive network, controlling the gating "on-off" of the triac. The value of the resistance network is selected to ensure that the RMS voltage remains below the level at which the lamp emits light until after the capacitor is past 6 percent of the time of the RC time constant. The firing angle of the triac varies gradually and smoothly to vary the RMS voltage applied to the light source from a zero-voltage level to the maximum available voltage level, such as line voltage.

BRIEF DESCRIPTION OF THE DRAWINGS

FIG. 1 is a block diagram of the electrical components of the invention.

FIGS. 2A and 2 are a circuit diagram of the components of FIG. 1.

BEST MODE FOR CARRYING OUT THE INVENTION

Figure 3:
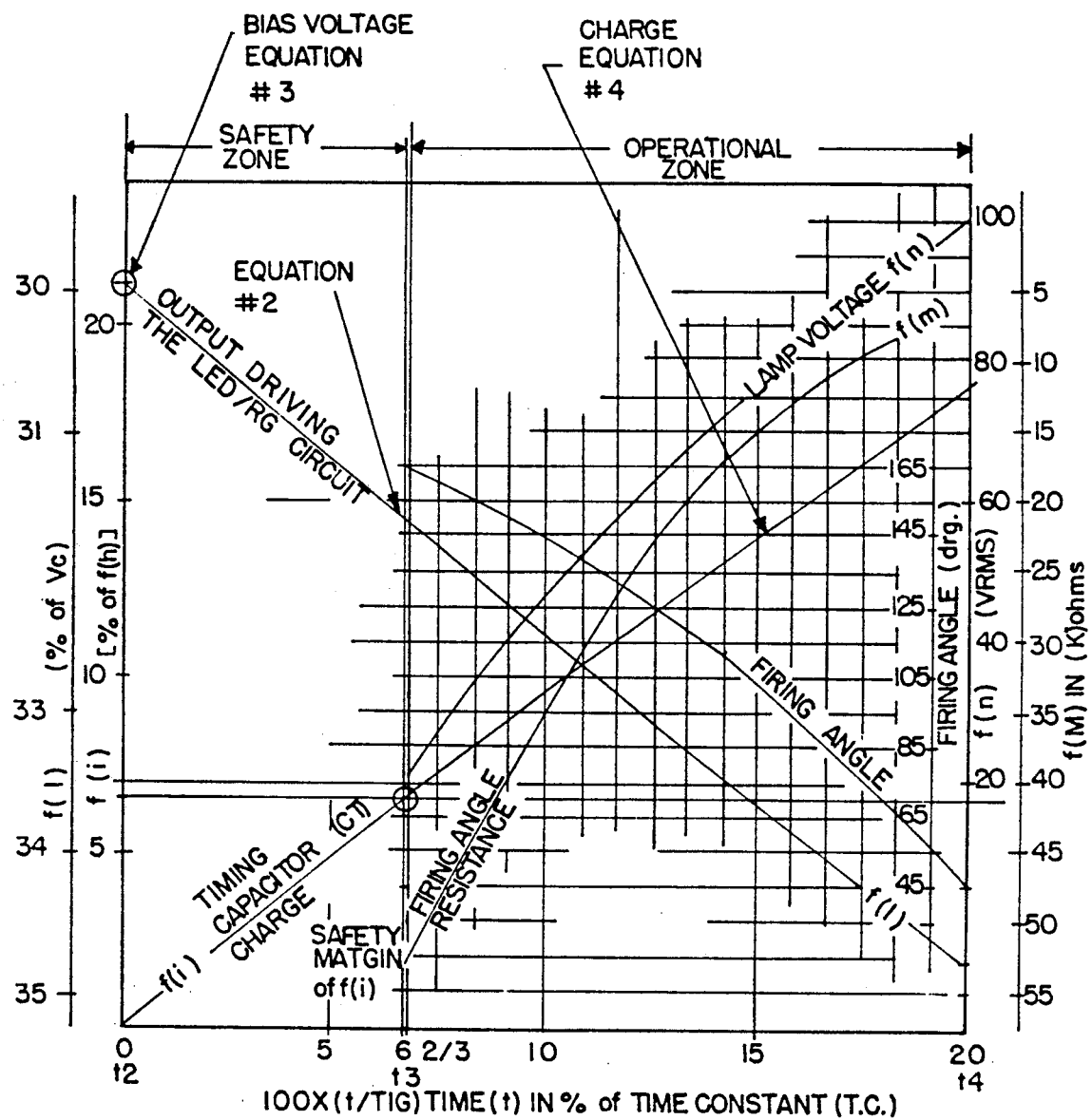
FIG. 3 is a window diagram plotting numerous parameters of the circuit of FIGS. 2 and 2A on the same graph.

The sensitivity of the eyes to light and variations in light intensity depends upon the state of the eyes, the background light, the wavelength, and other factors. When the eyes have become adjusted to the dark, after about 30 minutes, the eye is at least 10,000 times more sensitive to light than during the day, when the eyes are not dark-adapted. When the eye is dark-adapted, not only does the dilation of the eye change, the chemistry of the eye changes to make it much more sensitive to light and to changes in light intensity. A chemical called "rhodopsin" is present in significant quantities in dark-adapted eyes but is absent in light-adapted eyes. The dark-adapted eyes can sense even minute changes in light intensity, even below the level of consciousness of the person, when the background light levels are very low.

When the eye lids are closed and the person is asleep, a very faint light can be sensed by the dark adapted eyes. Signals are transferred to the brain and nerve cluster at the base of the brain, the suprachiasmatic nuclei, to began to slowly and gently change the body chemistry to prepare the body to wake up. As the light level increases, very small changes in intensity are sensed by the eye, because it is still dark-adapted, and the rate of change in the body's chemistry and internal wake-up clock can adjust to the gradually increasing intensity of the light.

Because of the sensitivity of dark-adapted eyes to variations in light intensity, a very smooth change in light level is preferred. If the increase in light intensity has step functions, jagged edges, or other irregularities, even very small irregularities, the eyes, being very sensitive, will recognize that the increase is not gradual nor constant and the waking process will be less pleasant then it could otherwise be. The eye is most sensitive to changes in light intensity at the very start of the waking process, when the eye is completely dark-adapted and the background light levels are low. Therefore, it is most important that the increase in light intensity be very smooth, and preferably slow, at the very beginning of the wake-up cycle. The circuit having the amplifier and LED biased into the "on" condition prior to receiving the wake up signal ensures that the increase will be very smooth and gradual, even from the very beginning.

The circuit for directly controlling the light intensity of a lamp smoothly, gradually and automatically, similar to the rising or setting of the sun, is illustrated in block diagram form in FIG. 1. The circuit includes an input into a buffer circuit 12 from an alarm clock 10. The alarm clock provides a wake-up signal at a preselected time, as determined by the user. Any standard alarm clock circuit may be used to provide the signal, as is well known in the industry.

The buffer circuit 12, after appropriate amplification and filtering, provides a signal to charging circuit 14 to begin varying the voltage applied to a lamp 26. The charging circuit is coupled through an amplifier 16 to the LED of an optocoupler 18. Varying the intensity of the LED in optocoupler 18 causes the power provided to lamp 26 to be varied. The power is varied by changing the firing of the angle of a triac in power supply circuit 20 coupled to line voltage source 24. The particular voltages and power required for the respective circuits are provided by DC power supply 22, which receives input power from line voltage power supply 24. The power provided to the lamp 26 may be directly controlled, either decreased or increased or preset to a selected level, by the manual circuit 28 coupled to charging circuit 14.

A detailed circuit diagram of the clock circuit of FIG. 1 is illustrated in FIGS. 2A and 2. An alarm clock circuit 10 is coupled to an alarm node input 30 of the buffer circuit 12. The buffer circuit 12 includes, in one embodiment, an amplifier 32 coupled through a capacitor 34 to alarm circuit input 30. The gain of the amplifier 32 is determined by the value of resistors R24 and R25, as is well known in the art. The output of the amplifier 32 is coupled, through a capacitor 36, to the input 38 of the charging circuit 14. In an alternative embodiment, Option 5, the buffer circuit 12 includes a light-emitting diode 35 adjacent a light-sensitive transistor 37 coupled to the input 38 for providing the signal from the alarm input 30 to the charging circuit 14.

The input 38 to the charging circuit 14 is coupled to the set input of RS flip-flop 40. The filter capacitor, C10, at the triggering input 38 filters transients to prevent false triggering which may be caused by power line surges, glitches, or other transients. Resistors R22 and R23 bias the set input to flip-flop 40 at half of the power supply voltage, Va, for noise rejection. The output, node f(g), of the flip-flop 40 is pulled up to a given voltage level, usually the level of the positive power supply, Va, on the negative-going pulse at the input 38 of node f(f). The output, Q, of RS flip-flop 40 is coupled through resistor network R17 and R16 to zener diode 42. The voltage of the output of the flip-flop 40 is reduced in node f(h) by the resistive network R17 and R16 to a value within the range of the most stable operational range of the amplifier 48 for the time period of particular concern. In a preferred embodiment, this value is approximately 4 volts, though any other suitable value may be used. A zener diode 42 is selected having a very high reverse impedance to minimize the leakage through it from capacitor 44.

The time constant of the RC circuit formed by potentiometer 46 and capacitor 44 is given by the equation:

$$T.C. = RC \quad (1)$$

where T.C. is the time constant of the RC circuit. Potentiometer 46, Vr2, is selected to be relatively large to provide a long-time constant and a slow charging rate of the timing capacitor 44. The resistance of potentiometer 46 is manually adjustable by the user at control 43 to set the time constant at any desired value, generally from as low as two minutes to greater than ten hours.

The voltage of the timing capacitor 44 is coupled to the input of amplifier 48. The amplifier 48 is selected to have an extremely high input impedance, for example, over a billion ohms or greater, to minimize discharge through it of the timing capacitor 44. An FET input opamp is suitable for amplifier 48. The amplifier 48 operates as an isolating buffer, similar to an emitter follower with a gain of one. The output at node f(j) of amplifier 48 exactly follows the input from the timing capacitor and is equal to it.

The output f(j) from the amplifier 48 provides the output from the charging circuit 14 and the input into the amplifier circuit 16. The amplifier circuit 16 includes, in the preferred embodiment, an inverting amplifier 50 having a negative gain. The output of amplifier 50 to node f(l) is biased to a negative starting point by a constant negative-biased voltage at node f(k). The input from node f(j) to amplifier 50 is to the inverting input and therefore inverts the signal from the output of operational amplifier 48. The gain of operational amplifier 50 is determined by the equation:

$$\text{Gain} = \frac{R10}{R11} \quad (2)$$

The gain is selected to be a value less than one by making R11 greater than R10.

The gain of amplifier 50 is made negative to ensure that the operation is stable. By making the gain negative, many advantages are achieved in providing a more stable output. For example, the amplifier operates in the middle of its rated range at all times and does not operate at either end of its rated range, where the output is less stable. Further, variations in the input, including any noise, are reduced rather than amplified. This makes the output more smooth and stable. The circuit providing power to the LED need not include a negative gain amplifier, so long as the circuit provides a sufficiently smooth and stable output. It has been found that use of a capacitor followed by a negative gain operational amplifier is one way to achieve a sufficiently smooth, stable output.

A constant, negative-biased voltage is provided at node f(k), as determined by the equation:

$$f(k) = \frac{R13}{R13 + R12} \times Vc \quad (3)$$

The constant, negative-biased voltage f(k) provides a negative voltage bias level at the output node f(l) of operational amplifier 50, while the input from node f(j) determines the additional negative swing at the output, giving a total output f(l), which is equal to the amplified combination of the voltage on the timing capacitor f(i) and the negative-biased voltage f(k).

The voltage on the node f(l) is given by the equation:

$$f(l) = \underbrace{f(i) \times \frac{R10}{R11}}_{\text{(Part A)}} + \underbrace{\frac{\frac{R13}{R13 + R12} \times Vc \times (R10 + R11)}{R11}}_{\text{(Part B)}} \quad (4)$$

When the capacitor is not charging, or is not charged, the voltage of node f(i) is zero volts and Part A of the equation goes to zero, resulting in the voltage at node f(l) on the output of operational amplifier 50 being determined solely by the constant negative-biased voltage, as given by the Part B of the equation. In the preferred embodiment, the constant negative-biased voltage at node f(l) is 1.5 volts, based on a selection of an amplifier having very stable operation in that range and to avoid transient responses.

The output of amplifier 50 is coupled to the LED 52 of the optocoupler circuit 18. The LED 52 is held in the "on" state at all times by the output from amplifier 50. The constant, negative-biased voltage of the amplifier 50 is selected to provide an output to the LED 52 which holds it in the "on" state in a range of stable operation. Generally, this range of operation will be just slightly above the voltage at which the LED begins to conduct and is fully "on." It is selected to be above the voltage at which the LED switches "on" to ensure that discontinuities, glitches or transients often occurring with an LED switching from "off" to "on" are avoided.

The change in current through the LED 52 is directly controlled by the charging capacitor 44. The voltage on the charging capacitor 44 at node f(i) is given by the equation:

$$f(i) = [f(h) \times (1 - e^{(-t/T.C.)})] \quad (5)$$

Where t is the elapsed time in minutes since the alarm signal set RS flip-flop 40 to start the charging of the capacitor and T.C. is the time constant of the RC circuit in minutes.

The optocoupler cell photoresistor 54 is part of a parallel circuit with a resistor network 56 of lamp power circuit 20, as shown in FIG. 2. Resistor R2 and photoresistor 54 form parallel resistance network 56. The parallel resistive network 56 is coupled in series with resistors R1 and R3 to the gate of the triac 58. The total resistance of the parallel resistive network 56, $R_{Nt}$, is given by the equation:

$$\frac{1}{\frac{1}{R_p} + \frac{1}{R2}} = \frac{R_p \times R2}{R_p + R2} \quad (6)$$

The optocell 54 is selected to have a very high resistance, $R_p$, relative to resistor R2 when the LED is biased in the just slightly "on" condition by the output of amplifier 50. With the LED just slightly "on," the resistance, value $R_{Nt}$, of the parallel resistive network 56 will be approximately equal to the resistance of R2, as can be seen from Equation 6, because $R_p$ is so much higher than R2. The series resistance of R1, R2 and R3 is selected to ensure the firing angle of the triac 58 is so high that the lamp does not emit light.

The value of $R_p$, with the LED in the slightly "on" state, is in the range of 100 to 10,000 times greater than R2. The exact ratio selected depends on the rate at which the resistance is desired to be lowered in response to the gradually increasing brightness of the LED 52. In a preferred embodiment, R2 is 56 kohms and $R_p$ varies from above 1 Mohms to approximately 300 ohms. Because $R_p$ is so much greater than R2 when the lamp begins to emit light, linear changes in $R_p$ effect very, very small, nonlinear changes in $R_{Nt}$, and thus increase the brightness of lamp 26 only a very small amount. For example, when $R_p$ is much greater than R2, if $R_p$ decreases 1000 percent, the network resistance, $R_{Nt}$, will decrease less than 1 percent. As $R_p$, starting at a different value is reduced, for example, another 1000 percent, this may decrease $R_{Nt}$ by about 10 percent. As $R_p$ becomes almost equal to R2, further changes in $R_p$ produce a greater percentage change in $R_{Nt}$. For example, a 10% change in $R_p$ may produce a 5% change in $R_{Nt}$. As $R_p$ continues to go lower, so as to be much lower than R2, the value of $R_p$ becomes controlling and the network resistance $R_{Nt}$ will be approximately equal to $R_p$ and will follow it almost exactly. The exact rate of change can be seen by plotting $R_p$ versus $R_{Nt}$ based on Equation 6.

The use of a single resistor in a parallel resistive network to control the firing angle of the triac causes the intensity variation of the light to be very, very gradual and slow at the low light levels, but the rate of intensity variations to be greater at higher light levels. A very gradual increase at a low light intensity level is preferred for this invention because the human eye is much more sensitive to variations at low light intensities with low background light than to variations of high light intensities with a high background light level, as is well known in the art. The dark-adapted eye of the sleeping person is particularly sensitive to changes of intensity at low light levels. The use of a parallel resistive network and selection of R2 and $R_p$ provide that changes in light intensity occur very slowly at low light levels and more rapidly at high light levels for awakening a sleeping person. To the eye of the sleeping person however, the light intensity increase is gradual and steady because the eye becomes less sensitive to changes in intensity as the light increases, as discussed in U.S. Pat. No. 3,684,919 to Cramer, incorporated herein by reference. Additional parallel resistors or parallel photoresistors adjacent the LED may be used if desired.

As the resistance of the parallel resistive network, $R_{Nt}$, decreases, the total series resistance decreases, thus lowering the firing angle of the triac 58. As the firing angle of the triac 58 is lowered, the RMS voltage provided to lamp 26 increases accordingly.

The use of an optocoupler circuit isolates the lamp power supply circuit 20 from the remainder of the circuits, allowing the power supply 22 to be transformerless. The RMS voltage provided by the lamp power supply circuit 20, including the triac 58, smoothly and gradually increases. The net resistance of the series resistors R1, $R_{Nt}$ and R3 determine at what angle the triac 58 begins to fire. The combination of capacitors C1 and C2, in parallel with resistor R3, acts as a filter to prevent false firing of the triac 58, which may be caused by transients, harmonic response or the like. The combination of inductor L1 and capacitor C3 filter out power line transients and the like caused by the firing of the triac or from the power line. A fuse 60 is provided to ensure that the circuit is not damaged due to overloading.

The power supply 22 provides the DC voltages for circuit operation. A positive voltage, Va, is provided to the respective circuits, as indicated in FIG. 2A. A negative voltage, Vc, which is the opposite of Va, is provided to the circuitry, as shown in FIG. 2A. Zener diodes D2 and D3 and capacitors C4 and C5 are selected to ensure that Va is always equal to negative Vc. A common voltage source (com) is provided in the node between capacitor C4 and C5 in the power supply 22, as shown in FIG. 2. The common (com) supplies the reference for all other supply voltages and acts as system ground. The zener diode D4 is a backup diode and prevents possible damage to the circuits if one of the zener diodes, D2 or D3, fails. Diodes D5 and D6 rectify the input line voltage across f(a). Diode D5 is provided as a backup diode in the event diode D6 shorts or vice-versa.

The lamp 26 is coupled to the lamp power supply circuit 20 using any one of several known wiring patterns. In Option 1, the lamp 26 is wired as a main light in a room, the light being in the ceiling and the switch being located on the wall. The master light in the room, such as the one mounted in the ceiling, is generally positioned sufficient near the sleeper to awaken him. For Option 1, the input power is provided from one wire going to the lamp, the lamp being in series with the various circuits of this invention. The power provided to the circuit will be lowered by the voltage drop across the lamp 26 when the lamp is coupled using the wiring pattern of Option 1. For Option 1, regulation of the power supply is provided by the series regulator circuit combination of Q1, R5, R6 and D7; all of which dissipate virtually all of the power supply's heat. R5 is selected to be large enough to limit the current of Q1 to a safe value. D7 limits the peak base voltage of Q1 to a safe value. C6 filters out transients from the power supply to prevent false triggering of the flip-flop 40 in the charging circuit 14. The alternative circuit having transistor Q1 is required to regulate over a relatively large range, from about 105 volts RMS to approximately 20 volts RMS, because, as the lamp increases in brightness, the voltage f(a) provided to the power circuit is correspondingly decreasing.

The lamp 26 may alternatively be connected as shown in Option 2 of FIG. 2. In Option 2, a standard house plug is provided for the circuits of this invention to be plugged into any desired wall outlet. A industry standard-sized wall outlet 26 is provided into which a lamp (not shown) may be plugged. The power provided to outlet 26 for the lamp follows the power curves described herein to permit the power to the lamp to be varied as described.

A power supply for an alarm clock may be provided by Vb from the power supply, as illustrated by an alternative embodiment of Option 3, if desired. R7 and R8 perform a divider for clock supply voltage, which is filtered by C7.

The manual switch control 28 provides manual control of the light intensity to a selected value. Switches are provided to permit the user to manually select a light intensity value or to move the light intensity up or down. One switch, SW1, selectively couples the charging capacitor to ground through a bleed resistor R20 to discharge the circuit and turn the lamp "off." The discharging of capacitor 44 through bleed resistor R20 can be stopped at any time by the user to hold the intensity of lamp 26 at any desired level. The leakage of capacitor 44 is sufficiently low and the resistance presented by zener diode 42 and amplifier 48 are sufficiently high that the intensity of the lamp 26 will remain constant for several hours, or even days. Another switch, SW2, may be depressed to gradually manually increase the light intensity to any desired level by manually charging the timing capacitor by directly coupling the timing capacitor to the voltage supply Va through resistor R18, having a significantly lower value than potentiometer 46.

The operation of the circuit can be understood by viewing the relative voltages at each of the nodes and the relationship between them, as shown in FIG. 3. At a time $t_1$, a start pulse is provided by an alarm clock or other external circuit to begin the operation of the circuit. A negative-going pulse to the input of the RS flip-flop 40 causes the RS flip-flop to come "on" at a time $t_2$ and remain on until the circuit is reset. As shown in FIG. 3, the charging capacitor 44 begins to charge from a low voltage level at time $t_2$, approaching a maximum voltage as determined by the resistive network R17 and R16. The time taken for the capacitor voltage to reach the final voltage is determined by the time constant, as previously described. After 6⅔ percent of the time constant has passed, the voltage at the charging capacitor in node f(i) reaches a level at which the lamp 26 begins to emit a faint glow, visible to the dark-adapted eye, as indicated by time $t_3$ in FIG. 3. The voltage on the charging capacitor continues to rise in a gradual, smooth and linear fashion from $t_3$ to $t_4$. The time $t_4$ is 20% of the time constant of the RC circuit. The voltage level on the capacitor, to which node f(i) is charged, will be significantly slower in charging after 20 percent of the time constant has elapsed, as the voltage increase on the capacitor approaches the final voltage f(h). However, for the time period from $t_3$ to $t_4$, the voltage rise in node f(i) is extremely smooth, gradual and generally linear. The time period from $t_3$ to $t_4$ represents the time period in which the lamp first begins to glow in a manner perceptible to the most sensitive eye at time $t_3$ until the lamp is sufficiently bright at time $t_4$ that further increases in lamp voltage do not result in intensity changes detectable by the human eye.

The output of operational amplifier 50 is illustrated in FIG. 3 as the voltage at node f(l). The voltage is biased to a negative value, such as 1.5 volts, by the resistive network R13 and R12, as amplified by the operational amplifier. The operational amplifier 50 is held in the "on" position and in a stable operating range at all times to minimize the occurrence of transients associated with the turning "on" of the amplifier, LED and the like. Further, the LED is turned "on" at all times, previous to the capacitor 44 being charged, to ensure that transients associated with the switching "on" of the LED do not affect the intensity of the lamp 26.

The beginning of the charging of the capacitor 44 represents a zone of safety below which the lamp voltage f(n) remains so low that the lamp is in the "off" condition. The gain of amplifier 50, value of resistors R3, R2 and R1, and the operating characteristics of photoresistor 54 and triac 58 are selected to ensure that the lamp does not emit light during the initial charging of the timing capacitor 44. This zone is generally selected to be at least 5 percent of the time constant of the voltage rise at the node f(i) and, in a preferred embodiment, is 6⅔ percent of the time constant of the rise in voltage at f(i). This safety zone prevents the lamp from lighting during the initial charging state of the capacitor 44. This ensures that transients associated with the beginning of the charging of the capacitor do not affect the changes in light intensity of the lamp 26. When the voltage at node f(i) reaches the level of approximately 6⅔ percent of the time constant, the output of the amplifier 48 drives the output of the amplifier 50 in node f(l), sufficiently negative to lower the combined resistance of the optocoupler resistor 54 and R2 to a value at which the firing angle of the triac provides sufficient power to the lamp that the lamp emits a faint glow, a very low-intensity light. The glow is sufficiently faint that in full day light or in a room of high background light, the human eye does not detect the lamp glowing. However, after the person has been asleep for many hours, the dark-adapted eye is 10,000 times more sensitive to light than during the normal waking conditions. The eye of the sleeping person, therefore, detects a faint glow coming from lamp 26 and transmits this information to the brain of the sleeper, even though the voltage on the lamp 26 is extremely low, for example, 2 to 8 volts RMS.

The voltage on the lamp f(n) rises from zero volts RMS towards line voltage, for example, 120 volts RMS at time $t_4$. The voltage across the lamp will gradually and smoothly increase according to the equations as provided herein towards full line voltage for the lamp, which is approximately 120 volts in Option 2 and approximately 105 volts in Option 1. After time $t_4$, the light intensity may continue to increase as measured by instruments, if desired, but the light is sufficiently bright that further increases in brightness of the lamp are not detectable by the human eye. Generally, the time from $t_3$ to $t_4$ will be in the range of 30 minutes to 45 minutes. The user may select the time from $t_3$ to $t_4$ to be significantly greater than an hour or as low as 2 minutes, depending on a desired time to wake up by varying the value of potentiometer 46, using a manual adjustment knob 43.

One of the significant advantages of this invention is that each of the components operates within stable operational "windows" when the lamp 26 is emitting light. The capacitor 44 is selected to have very stable and linear operation as it charges from zero to a voltage just above the start of the charging curve to the maximum voltage provided at node f(h). A capacitor having stable operation in this voltage range will often have a top operating range significantly higher than this voltage.

Amplifiers 48 and 50 are selected which have very stable output characteristics over their range of operation. Usually the amplifiers will be operated in the middle of their rated range to ensure that the operation is stable. For example, the output of amplifier 50 varies from a high of 1.5 volts to a low of 1.75 volts corresponding to the lamp 26 being off to the lamp 26 being sufficiently bright that further increases in intensity are not detectable. While this is a very small voltage swing, amplifier 50 is very stable over this range and is thus suitable for varying the current drawn through LED 52. Similarly, LED 52 is held "on" at all times to ensure that its operation window is within the range of stable operation of the LED. Each of the components and the respective voltages at each node are selected to ensure that each device is operating in a stable window of operation during the time period from $t_3$ to $t_4$ when the intensity in lamp 26 is varying to provide a very smooth and gradual intensity curve to gently and smoothly awaken the sleeper. It is not required that the amplifier 50 and LED 52 be on at all times to ensure stable operation of the circuit. One method to ensure that the circuit elements are in stable operation from $t_3$ to $t_4$ is to have them "ON" prior to $t_3$. One way to ensure that the elements are "ON" prior to $t_3$ is to bias them "ON" at all times; but other techniques may also be used.

FIG. 3 illustrates the operational windows by including several parameters, plotted along a common time line but having significantly different values. The graph of FIG. 3 has the common time line of the time constant of the RC circuit formed by potentiometer 46 and capacitor 44. The time line increments are based upon the percentage of the time constant of the RC circuit, rather than on real time in seconds. The charge on the timing capacitor f(i) is represented by the curve f(i), as indicated, showing a safety margin of 6⅔ percent of the time constant of the RC circuit, prior to the remaining elements in the circuit permitting the voltage to be sufficient to cause the lamp to begin to glow in a manner perceptible to the dark accustomed eye. The lamp voltage f(n) is shown as a function of the time constant and will reach approximately 90 percent of the line voltage after 20 percent of the time constant of the charging capacitor has passed. The firing angle resistance of the triac 58 varies, as shown in Equation 6, in a smooth pattern, as the voltage on the timing capacitor increases. The output of the amplifier 50, f(l), the driving voltage of the LED 52, is a negative voltage and becomes more negative as the timing capacitor increases. The LED 52 is always operated in the stable range of operation to ensure that all changes in the intensity of the light are gradual and smooth. In the upper range of operation, after 20 percent of the time constant has passed, at relatively high voltages, the lamp voltage may include some transients not occurring during the low voltage operation of the lamp but these do not interfere with the basic operation of the invention. Such transients are permissible because the lamp is sufficiently bright that the human eye cannot detect changes in the brightness of a light which is already extremely bright.

The user can be gently and comfortably awakened using the lamp 26 of this invention as his alarm clock. The brain of the sleeper receives the signals from the eye that the room is beginning to brighten. As the light continues to very slowly increase in intensity, the rate of increase is also sensed by the brain. The brain sends out the appropriate control signals to start changes in the body chemistry of the sleeper. Even though the person is sleeping and may be in a very deep sleep at the time the light first emits a faint glow, the gradual increase of light over a one-half hour to one hour period brings the body functions slowly up to the waking state. By ensuring that the initial light intensity is very low and that all increases are very gradual and very smooth, especially at the beginning of the wake-up cycle, the body of the user is very gently and comfortably awakened. The jolts and sudden changes of state in the body of the sleeper caused by the prior art devices are thus avoided. Upon awakening, usually when the light is quite bright, the sleeper's body chemistry has adjusted to be prepared for the waking state. The user feels refreshed and ready to become active, rather than being irritable, grumpy and nonfunctional for a period of time. Some results of experiments indicate that performance throughout the day is significantly improved when the person has been awakened using the device and method of this invention.

The rate of light increase is fully selectable by the user. The user may lower the resistance of potentiometer 46 sufficiently that the light increases from very faint to very bright over a very short period, such as 2 minutes. While this is not the preferred time interval from $t_3$ to $t_4$, the light increase will be smooth and gradual over this short time period to awaken the sleeper at his selected rate and is thus preferred to prior art devices. Preferably, the time period from $t_3$ to $t_4$ is at least one-half hour and, in some environments, is preferred to be approximately one hour, as selectable by the user. One significant advantage of this invention is that the user may set the time period from $t_3$ to $t_4$ to be equal to the sunrise time interval, the interval between when the sky begins to lighten in the morning and when the sun actually appears on the horizon, for his latitude and particular location. As is well known, the time that the sky begins to lighten until the sun rises is greater for greater distances from the equator. A chart or electronic table (not shown) may be provided to permit the user to set the time period from $t_3$ to $t_4$ to be similar to the sunrise time. Alternatively, an electronic circuit may be provided (not shown) which, by inputting the latitude, will automatically set the potentiometer 46 to the correct value corresponding to lighting of the sky related to the sunrise time for that latitude. A ROM or other electronic chip having a look-up table stored therein and appropriate outputs to control the potentiometer 46 is a suitable circuit. The circuit may thus simulate the sunrise for any given location and time zone on the earth. The simulation will be smooth and natural to set the internal body clock of the user in synchronism with his environment.

The time setting of the alarm clock is selectable by the user, based on whether the time represents the wake up time or the start of the wake-up cycle. In the embodiment shown, the user sets the time $t_2$ at which the alarm pulse is provided to start the wake-up cycle. Because the wake-up time is generally 5 or more minutes after the alarm pulse is provided, the user will set the alarm for approximately 5 or more minutes before he wishes to be awake.

In an alternative embodiment (not shown), the user sets the clock to his desired wake-up time. The time interval from $t_3$ to $t_4$ has been previously selected, either by the user or by the manufacturer based on the setting of potentiometer 46. An internal circuit senses the value of potentiometer 46 and calculates the time from $t_3$ to expected wake-up time based on the time interval from $t_3$ to $t_4$. The circuit timer sets the alarm clock to provide the alarm signal the number of minutes prior to the alarm being set for wake-up time as appropriate to awaken the user at the desired wake-up time. The user need not be concerned with the length of the time interval from $t_3$ to $t_4$; the user need merely select a desired wake-up time and the circuit will begin to operate several minutes prior to this time to ensure that the sleeper will awaken at approximately the desired time. While a circuit to effect this second embodiment is not shown, a resistor bridge circuit, a ROM in combination with a simple logic array or microprocessor could easily be constructed by one of ordinary skill in the art to perform this function, given the description as provided herein.

Figure 4:
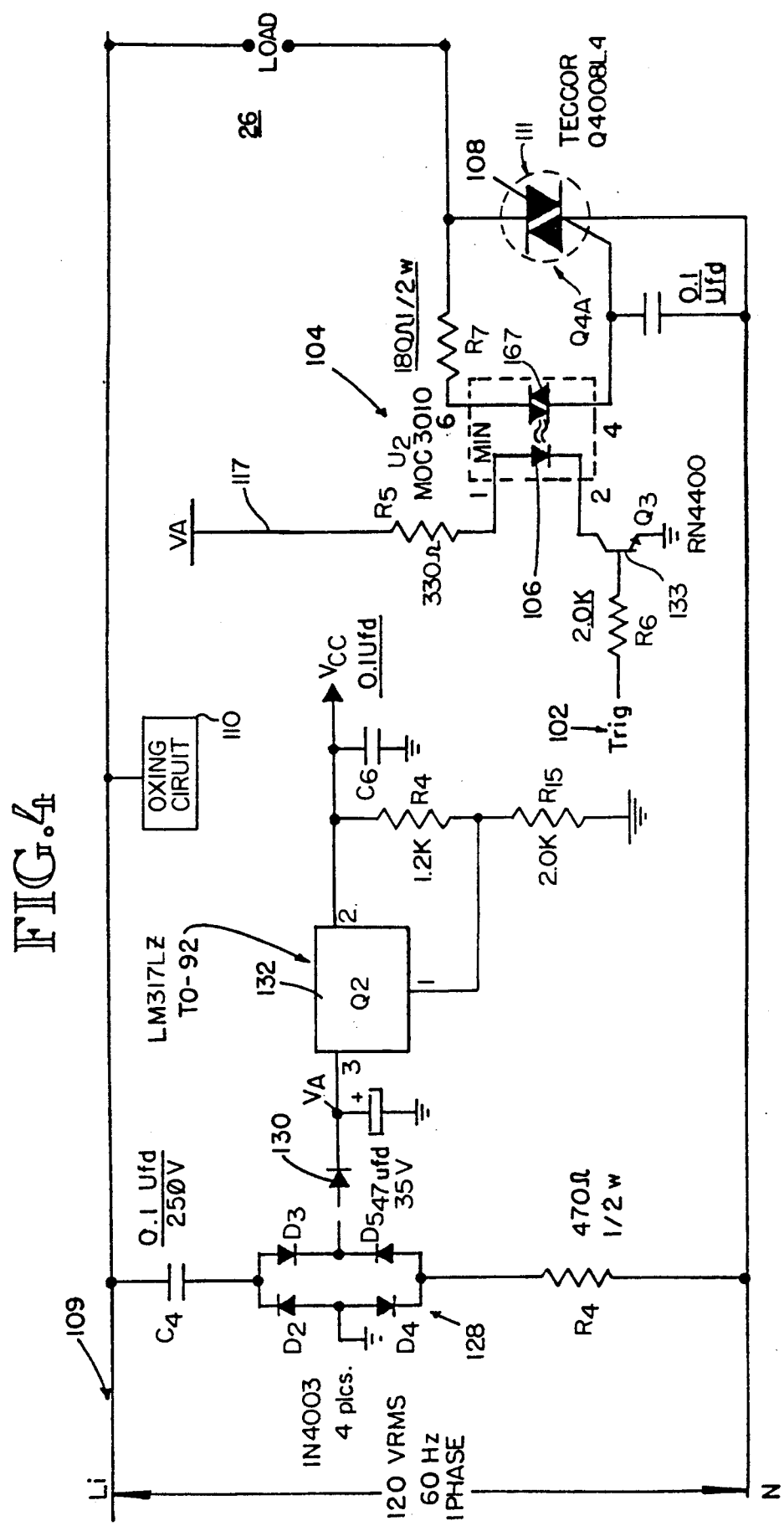
FIG. 4 is a schematic of an alternative embodiment for driving the variable voltage on the load.
Figure 5:
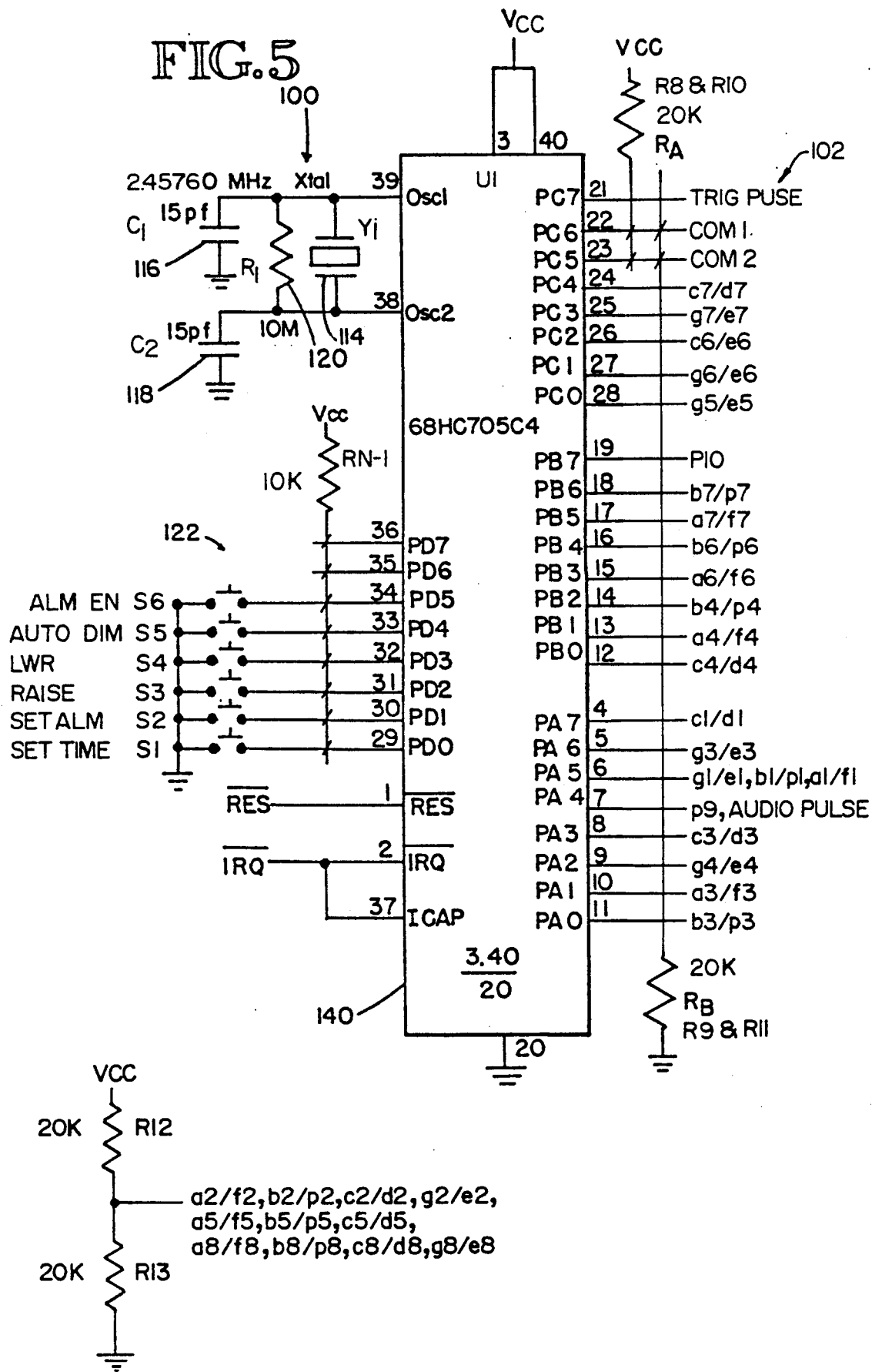
FIG. 5 is a schematic of a microprocessor controller for the alarm.
Figure 6:
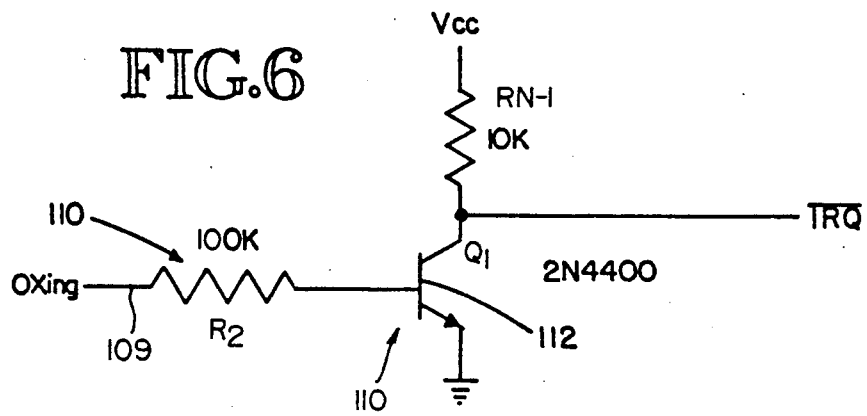
FIGS. 6–8 are schematics of circuits coupled to the microprocessor of FIG. 5.
Figure 7:
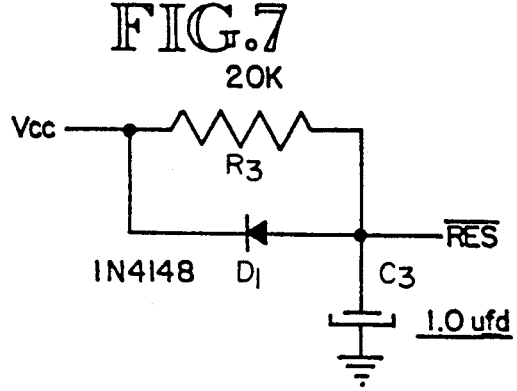
Figure 8:
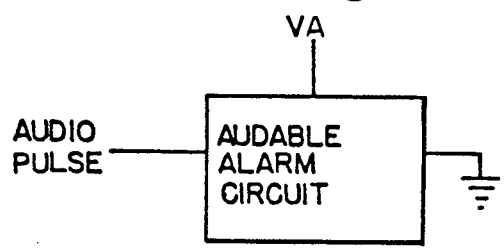

FIGS. 4-9 illustrate an alternative embodiment for implementing the invention with a microcontroller and digital controls. A microcontroller chip made by Motorola, the MC68HC705C4, is suitable for implementing the invention in the digital format, as shown in FIG. 5. The microcontroller of FIG. 5 includes a built-in 8 bit 4K byte ROM, an 8 bit 176 byte static RAM and an 8 bit 240 byte bootstrap ROM. The operation of the circuit is largely software designed in a manner more fully described hereinafter to accomplish the functions of the invention digitally that are performed by the analog circuit. The circuit of FIGS. 4-9 may be used in place of the circuit of FIGS. 2 and 2A to drive the lamp 26.

The microcontroller of FIG. 5 includes 24 bidirectional I/O lines and 8 input only lines. An on-chip oscillator is coupled to an RC or crystal/ceramic resonator 100 for onboard timing reference. The on-chip oscillator is periodically corrected based on the line frequency to ensure that the timing on the chip has the proper relationship to the line frequency. The chip also includes a memory mapped I/O, selectable memory configurations, bootstrap capability, power saving stop, wait and data retention modes, fully static operation, clock monitor, computer operating properly (COP) watchdog timer and software-programmable external interrupt sensitivity. Any microprocessor capable of properly controlling the circuit of FIG. 4 and providing the trigger signal 102 is suitable for use as the microprocessor in the invention.

Figure 9:
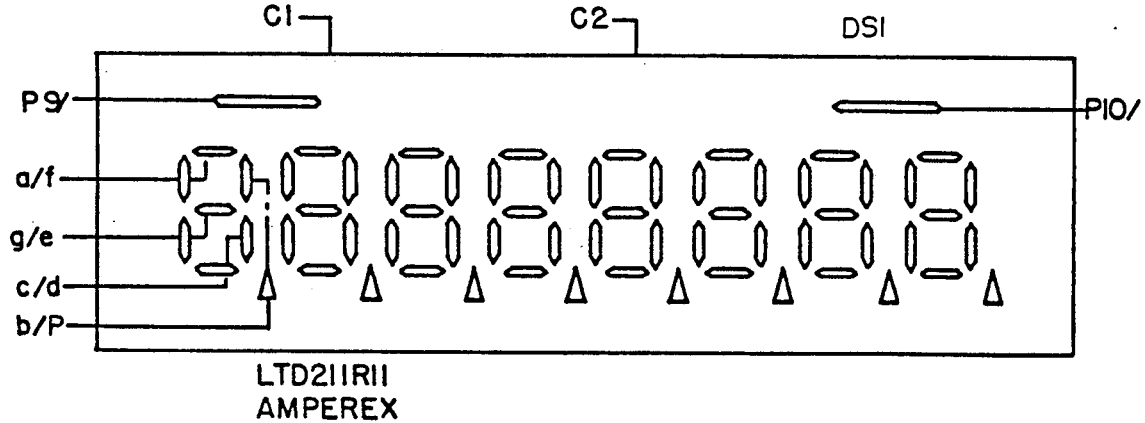
FIG. 9 is a schematic of the LCD display coupled to the microprocessor.

Referring to FIG. 9, outputs PA0-PA7, PB0-PB7, PC0-PC6 drive the segments of the LCD display. A suitable LCD for use in the application is the LTD 211 R11 produced by Amperex Corporation. The LCD provides read outs of real time, alarm time, status of the alarm, auto sleep and other circuit operations.

Pin PC7 supplies the trigger pulse 102 to pulse the optocoupler 104. A suitable optocoupler is the MOC 3010 available on the commercial market. A pulse on the trigger line 102 causes current to flow through the LED 106 of the optocoupler circuit 104 to turn on the triac 108. The triac 108 may be any triac having the appropriate power and response requirements. A triac 108 which has been found suitable is the Teccor Q4008L4. The trigger signal 102 causes the triac 108 to begin to conduct at a precise time in a cycle of the power line drive voltage, 109 L1 to N. By varying the timing of the trigger signal 102 relative to the line voltage cycle, the RMS voltage, and thus power, provided to the load 26 is varied.

As is known, once triggered, a triac remains on until the power signal reaches a zero crossing, which causes the triac to turn off. When the load is in the off condition, the trigger 102 is provided very late in the power line cycle, for example, at 172'-175°. If the trigger 102 is activated at 172°, the triac goes off 8° later at the next zero crossing at 180° and the RMS power reaching the load is very low. As the firing angle is deceased from 172° towards 10°, the RMS power applied to the load increases.

A zero crossing signal 110 drives a transistor 112. The output of the transistor 112, $\overline{IRQ}$ corrects the microcontroller chip's timing periodically to ensure that it is in step with the average line frequency at the zero crossing point. The 2.45760 MHz reference oscillator 100 is formed with the crystal 114, capacitors 116 and 118 and resistor 120 coupled to pins 38 and 39 as shown in FIG. 5. The crystal frequency of the crystal 114 is chosen to be a multiple of the line crossover points. A frequency of 2.45760 Megahertz has been found suitable. It is also divisible by the resolution steps, 2560.

$$2.45760 \text{ MHz}/(2560 \times 120) = 8$$

for an 8 bit microprocessor. Thus, the reference for the for an 8 trigger to the triac will match the line crossover, thus retaining an accurate reference for the trigger pulse going high relative to the zero crossing. The trigger pulse therefore will always be aligned relative to the zero crossing point of the line voltage. The zero crossing circuit 110 realigns the crystals' frequency with the line voltage zero crossing point to ensure that it remains aligned over time. The time that the trigger goes high relative to the line voltage zero crossing determines the firing angle of the triac, and thus the RMS power to the load, as previously described. Each half cycle is divisible by the resolution of the trigger pulse output, 2560, to provide increases in power of a range from zero to maximum in increments the size of 1/2560 of the line voltage. Each increment moves the firing angle backward only a small amount and the change in brightness a few increments is not noticeable to the human eye. The result is a smooth, gradual increase in the brightness of the light to gently awaken the sleeper.

User depressible switches 122 provide control of the microprocessor operation. The user depressible switches include an alarm enable, raise function, lower function, alarm set, auto dim and time set capabilities. Power is provided to the microprocessor of FIG. 5 by the bridge rectifier circuit 128 of FIG. 4. A diode rectifying bridge 128 is fed to a voltage regulator 132. A backup circuit includes the circuit of FIG. 7 having a diode and a one microfarred capacitor to protect the chip from power bumps that could cause erratic operation of the chip and also to supply a reset pulse RES to the chip when the line power goes down.

Referring to FIGS. 4 and 5, the microcontroller 140 has been programmed to supply the power curve to control the timing of the trigger pulse 102 to the triac. The mathematical formula for the controller is as follows:

Load Voltage = $V_{lamp}$ =
$$\{[\cos(S-(A/N)^2 \times R)+1]/2\} \times V_{line} \qquad (7)$$

where $V_{lamp}$ is the RMS voltage applied to the lamp, S is the selected starting angle at which the triac is triggered a first time when the lamp is off, A is the time since the alarm has occurred, in minutes, N is the user selected ramp time for the lamp to reach full brightness after the alarm is triggered, R is the range over which the firing angle varies and $V_{line}$ is the RMS voltage of the full power to the circuit. S is generally selected to be in the range of 172°–175° and in one embodiment is 172.3183594°. $V_{line}$ is generally about 117 volts, but may vary with local power fluctuations from 110 to 120 volts. Surges, glitches and other irregularities may also be present on the line voltage. As is clear from this specification, the circuit is designed to provide a smooth RMS voltage to the lamp even with surges, glitches or fluctuations in the line voltage. It may be any value from three seconds to three hours. As the time since the alarm (A) increases, the trigger pulses to the triac decreases from approximately 172° firing angle to approximately 8° firing angle.

An aspect of this invention which ensures smooth control of the light intensity is that the triac firing angle is not varied adjacent any zero cross point of the line voltage. As is known, the line voltage approximates a sine wave and has zero crossings every 180°, that is, at 0°, 180°, 360°, etc. The exact zero crossing point of the line voltage is subject to relatively wide fluctuations because of conditions in the power line beyond the control of the user. The firing angle of the triac is selected to be at about 172°, rather than 180°, when the lamp is in the "off" condition. With a firing angle of 172°, the last 8° of power of each half cycle is provided to the lamp (if the firing angle were 180°, it would be zero power). The RMS voltage is so low that the light is below the incandescent range, even in a very dark room. After the alarm sounds the firing angle is slowly decreased from 172° back towards 0°, at which point full line power would be provided to the lamp. However, according to the invention, the firing angle can decrease only to about 11°–10° because the range R is selected to prevent the firing angle from decreasing to the next zero crossing. That is, the firing angle clearly decreases from about 172° backwards towards an additional maximum decrease over the range R, which is about 162° backward; the RMS voltage to the load increasing as the firing angle decreases. After the firing angle has decreased an additional 162°, to about 10°, the light is sufficiently bright that the user is awakened, and further increases in light are not necessary. The transients occurring near each zero crossing are avoided by selecting a starting and ending angle spaced from the zero crossings of the line voltage.

The output of IRQ is a square wave that goes high at each negative going zero cross of the A.C. supply voltage and goes low at each positive going zero cross of said A.C. supply voltage. Each time $\overline{IRQ}$ transitions, it acts as an input signal to the chip 140 on pins 2 and 37. Once every several cycles of the A.C. signal, the zero crossing of the oscillator output signal is forced into alignment with the zero crossing of the A.C. signal. The output of oscillator 114 is at a frequency much higher than that of the A.C. signal, about 2.4 MHz, as previously described herein. The internal timing clock of the chip 140 is controlled by the zero crossings of the output of the oscillator 114. The timing at pulses of the internal clock and any output signal from the chip 140 are thus controlled by the oscillator 114, whose zero crossings are aligned relative to the zero crossings of the A.C. power supply.

The trigger pulse output line 102 goes high at a selected time in each cycle. The selected time is determined by the number of oscillations following each A.C. zero crossing. When the lamp is off, the trigger pulse goes high at a first time after the A.C. zero crossing after many oscillator cycles, corresponding to about 172° after the A.C. zero crossing. The triac 108 is on for only 8° of the cycle and very low RMS power is provided to the lamp. After the alarm signal goes high, the time at which the trigger pulse goes high is advanced to occur sooner after the A.C. zero crossing, at a second time. This has the effect of turning on the triac 108 earlier in the cycle, more closely following the A.C. zero crossing. The result is that more RMS power is applied to the lamp, resulting in a brighter glow. After the alarm signal, the selected time for the trigger pulse to go high is very slowly advanced from the first time, towards the A.C. zero crossing time, to very gradually increase the intensity of the light. The timing of the trigger pulse is very slowly advanced, resulting in a gradual increase in the light intensity. The rate at which the timing of the trigger pulse advances corresponds to the user selected ramp time, N. The earliest possible occurrence for the trigger pulse is a second selected number of oscillator cycles after the A.C. zero crossing, generally corresponding to about 10°–11° in the A.C. cycle. The light has almost full power when the trigger pulse occurs at 10° in the cycle and is thus bright enough to awaken the sleeper. However, by occurring about 10° after the zero crossing, the line transients associated with the zero crossing are not placed on the line voltage to the light 26 and the increase is smooth, according to the following formula:

$$\text{LumLamp} = (V_{load}/V_{rate})^3 \times 3.5 \times \text{LumRate} \qquad (8)$$

where LumLamp equals the lamp's luminance, $V_{rate}$ equals the lamp's rated voltage, LumRate equals the rated luminance of the lamp at the lamp's $V_{rate}$.

The manual control switches 122 to the microcontroller of FIG. 5 are defined as follows: depressing either lower or raise switches stops the auto alarm or auto dim operation at the light level at that moment and allows the manual controls for "raise" and "lower" to be used. Set Alarm allows alarm time displayed on the LCD to be set by the user with "raise" or "lower" switches. Alarm Enable activates or deactivates the alarm. Auto Dim activates the auto dim operation where the level of the light at the time the auto dim button is depressed begins to decrease following the above formulas until the light is completely out. The Time Set switch permits adjustment of the clock time. When the Time Set is depressed, the displayed time is raised or lowered by the raise or lower switches as controlled by the user. When the indicated time equals the desired set time, the switches are released. Programming of manual buttons to accomplish this are well known in the art.

FIGS. 4–9 illustrate a particular digital circuit and microcontroller for realizing the invention. The circuit includes digital components such as the microcontroller 140 and analog components such as the line voltage from L1 to N and triac 108. Any other digital circuit capable of performing a similar function would be suitable for use in place of that shown.

The invention may also be used to aid a person, particularly an infant, in falling asleep using the auto dim switch. The user may set the light to be fully or partially on and then press the switch to start the auto dim cycle. The infant will comfortably lie in bed without having to be afraid of the dark. Over a ten-minute to minute to two-hour period, as determined by the setting of the ramp while pressing the Set Alarm and Time Set switches, then pressing the raise or lower switches to raise or lower the ramp time. The ramp time is the time for the light to increase from no light to its maximum brightness. The light intensity will slowly decrease using the same mathematical curve as described herein for increasing the light. The infant will fall asleep as the light slowly grows dimmer. The infant will be asleep prior to the lamp going out completely and will thus have a gentle and easy sleep. The same light may be used to awaken the infant at a given time the next morning, based on a similar time interval, if desired. The infant is thus allowed to fall asleep without fear. The circuit may also be used by adults, if desired, to ease them into a sleepy state based on changes of light to simulate the setting of the sun.

While a lamp 26 has been shown as the load, any other load to be smoothly driven may be used. For example, a motor, drill or inductive load or other load may be driven by the circuit of this invention. A switch to permit the power provided to the load to be rapidly and manually variable as directly controlled by the user may also be provided if desired.

In the digital embodiment, a microcontroller integrated circuit or "chip" having a resolution of 2,560 steps (greater resolution can be obtained by the choice of microcontroller chip) allows very precise control of the phase angle of a triac that follows a mathematical curve to match the sun dawn or dusk cycle; it is programmed to change the triac's phase angle very slowly from the point where the lamp's intensity is "off" or zero, very slowly, smoothly, steadily, and gradually increasing the light level in very imperceptible steps (to the human eye) following the above-mentioned mathematical curve of equations 7 and 8 to the designed maximum intensity. In fact, if an observer were watching the lamp, the observer could not exactly determine the point at which the lamp went from total darkness to point of minimum light intensity. Refer to this transition point as "Intensity #1" or "Int #1," and the following points (as the intensity increases following the mathematical curve mentioned) as Int #2, Int #3, Int #4, and so forth. At first, after the start of a so-called "dawn cycle," the change of intensity from "off" to Int #1 to Int #2 and so forth is very slow following the mathematical curve of equations 7 and 8; but the rate of change increases as the light level or intensity becomes brighter. This change of the rate of change is important to control to accomplish precisely influencing the wake center in the human brain. These steps are so small that they are not apparent to the human eye.

The digital version also has the advantage that the aforementioned mathematical curve can be changed and programmed to fit new findings about the human system, such as psychological, neurological, physical, metabolic. Also the time from low light to maximum intensity can be easily varied as well. The digital version allows the user to control manually the light level in a smooth manner using the digital method. An automatic dusk feature is available—by the press of a button, a full on lamp will begin to dim gradually, smoothly, and slowly following the aforementioned mathematical curve until it is completely off, lulling a person or even a baby to sleep. In the wakeup cycle, an audible alarm of ringing, music, or the sound of waves beating on a seashore can be enabled by a pulse at PA4 on the microcontroller 140 when the light intensity reaches a predetermined brightness level to soothe the subject. The sunrise cycle is initiated by a pre-set alarm feature that is controlled by the microcontroller's internal clock which can be displayed on an LCD. The LCD also indicates the present location on the mathematical curve. In different areas of the world, a different curve will be required because of the different requirements of the climate, the latitude, and other factors affecting the sunrise time in nature, etc. The option to be able to program the curve into the microcontroller chip to fit locality requirements is one of the advantages of this device. This device controls the triac using an optically coupled pulse to a low power triac which in turn gates the power triac "on." The timing of this pulse determines the turn on time which in turn determines the voltage to the lamp. This pulse is referenced to an internal oscillator on board the microcontroller chip. By updating the oscillator to an exact reference to the line crossover point, the oscillator is accurately phased and the pulse to the triac is accurately referenced. A digital filter is programmed into the microcontroller chip preventing noise on the line from causing false triggering of the power triac. The onboard oscillator is crystal controlled by a ceramic crystal and is not subject to sudden line frequency variations that would cause the lamp intensity to suddenly change.

The digital version is a relatively inexpensive device that simulates sunrise and sunset digitally, accurately, smoothly, slowly, gradually, and in manner to fit the wakeup cycle of the human subject, and can be programmed to fit the latest "art" for wakeup and therapy devices. Another option for the application of the digital version uses feedback of the line voltage to control the delay of the trigger pulse to the triac which prevents variations in lamp intensity when line voltage levels vary.

One important consideration of artificial dawn is that the transition from total darkness of the lamp to the point of minimal light, intensity or the point at which the human eye can detect any light requires precision control to prevent sudden jumps in light level. In the inventive device this is readily accomplished by the use of a crystal controlled oscillator 114 that is locked to the average crossover point of the A.C. line by circuit 110 as explained herein. This crossover is rigidly defined by the fact that a digital filter eliminates the line noise that might cause false locking of the oscillator. The circuit and clock are quiet and use no mechanical devices except the six switches for programming and control. Any audible noise that would be disturbing to a sleeping subject is avoided. The invention uses a digital clock consisting of known microcontroller software and the LCD. Since there are no mechanically operating components in the circuit, and only solid state large size integration is used without batteries to power or bias, but instead a U.L. approved transformerless method to power the circuit and an optocoupler to isolate from the A.C. line is used, the invention provides smooth waking of a sleeping person. Therefore the invention is potentially very small in physical size and is practical in its real world application.

The turn-on characteristics of the bulb are precisely controlled at the lowest possible level of incandescence to prevent the erratic jump in light that is characteristic of incandescent bulbs. To accomplish this, the gating of the triac is isolated from the load. Circadian rhythm or the body clock is influenced by light intensity precisely controlled from very low levels to higher levels where the load voltage follows a defined mathematical curve as given by equation 7.

In one embodiment of the digital circuit of FIGS. 4–9 using the new (1989) VLSI Microcontroller chip made by Motorola, the MC68HC705C4, with built in 8-bit 4k byte ROM, an 8-bit 176 byte static RAM, and an 8-bit 240 byte bootstrap ROM; and software designed following the principles explained herein is selected for the microcontroller 140. Such software could easily be designed by any person of ordinary skill in the art given the circuit and principles of the invention as disclosed herein. All of the functions of the analog circuit can be accomplished by the digital circuit, but digitally instead of using analog methods. This circuit of FIGS. 4–9 is planned to replace the analog version in production. The chip 140 has 24 bidirectional I/O lines and 8 input-only lines. An on chip oscillator with RC or Crystal/Ceramic Resonator options for onboard timing reference which is periodically corrected to line frequency (as previously described), a memory-mapped I/O, selectable memory configurations, boot-strap capability, power-saving STOP, WAIT, and DATA RETENTION MODES, fully static operation, clock monitor, computer operating properly (COP) Watchdog Timer, and SOFTWARE-PROGRAMMABLE external interrupt sensitivity are many of the capabilities of this chip 140.

Referring to FIG. 5, the microcontroller chip 140 outputs PA0-PA7, PB0-PB7, PC0-PC6 (pins 4–11, 12–19, and 22–28) drive the segments of the LCD (liquid crystal display), part number LTD 211 R11, sold by Amperex. The LCD is used to read out real time, alarm time, and indicate the status of awake alarm, auto sleep (dim), and time of RAMP and position on RAMP.

Pin 21 (PC7) supplies the "Trig" to pulse the optocoupler MOC 3010, which in turn triggers on the triac, a TECCOR Q4008L4, at the appropriate firing angle. The zero crossing signal (OXing) drives the transistor 112 (see FIG. 6), whose $\overline{IRQ}$output term corrects the microcontroller chip 140's timing periodically to be in step with the average line frequency, but yet independent. When trigger 102 goes high, transistor 133 is turned on, permitting current flow through the transistor 133 to turn the diode 106 on. The diode 106 coming on triggers the triac 108 through the triac 167. Pins 38 and 39, along with the xtal, the two 15 pfd capacitors, and the 10 megohm resistor, form the reference oscillator of about 2.4576 MHz. The switches to pins 29–34 (PD0-PD5) control all the functions in the system, as noted by the labels in FIG. 5. Power is normally supplied by the line, rectified by the bridge (four IN4003 diodes), and fed to the LM317LZ voltage regulator. The circuit consisting of a 20K resistor, IN4848 diode, and 1.0Ufd capacitor protects the chip from power bumps that could cause erratic operation of the chip and also supplies a $\overline{RES}$pulse (reset pulse) to the chip when line power does go down. Referring to the drawing, the microcontroller's built-in ROM is programmed to supply the curve that controls the timing of the "Trig" pulses to the triac which effectively controls the lamp's voltage which controls the lamp's luminance following the mathematical formula of equation 8, repeated here for convenience.

$$LumLamp = (V_{load}/V_{rate})^3 \times 3.5 \times LumRate \qquad (8)$$

where LumLamp equals the lamp's luminance, $V_{rate}$ equals the lamp's rated voltage, LumRate equals the rated luminance of the lamp at the lamp's $V_{rate}$.

As time since the alarm increases up to N minutes maximum, the trigger pulses to the triac decrease from about 175° firing angle to about 5° firing angle at which the load voltage is maximum.

We claim:

1. An apparatus for varying the brightness of a light in a smooth and gradual manner, comprising:
    an A.C. power supply source means for providing power to said light at a frequency and power generally available on a power distribution system, said A.C. power supply having zero crossings;
    a zero crossing sensor means for sensing each zero crossing of said A.C. power supply and outputting a zero crossing signal at each of said zero crossings;
    an oscillator circuit coupled to the output of said zero crossing sensor and receiving said zero crossing signals, said oscillator circuit outputting an oscillating frequency signal having a plurality of zero crossing points in between each zero of said A.C. power supply and at least one of said oscillator zero crossings occurring simultaneously with said A.C. power supply zero crossings;
    a micro computer circuit having an internal timing clock controlled by said oscillator's zero crossings to ensure that said timing clock generates pulses whose occurrence is exactly positioned relative to said zero cross of said A.C. signal, said micro computer circuit including a trigger, a pulse output line, and an input signal line, said trigger pulse output line going high at a selected time after said A.C. signal zero crossing as measured by said internal timing clock, said selected time being variable from a first time after said zero crossing to a second time after said zero crossing, said second time occurring more closely after said A.C. zero crossing than said first time occurs after said A.C. zero crossing, said selected time gradually varying from said first time to said second time after said input signal goes high;
    a gate circuit coupled to said trigger pulse output line, said gate circuit going high when said trigger pulse line goes high; and
    a triac circuit having its gate coupled to said gate circuit for causing said triac circuit to turn on and provide power to said light from said trigger pulse output going high until said A.C. power supply passes through a subsequent zero crossing to thus control the intensity of said light based on said selected time of said trigger output line going high.

* * * * *